US008284540B2

(12) United States Patent
Fujii et al.

(10) Patent No.: US 8,284,540 B2
(45) Date of Patent: Oct. 9, 2012

(54) PROCESS OF PRODUCING ACTIVATED CARBON FOR ELECTRIC DOUBLE LAYER CAPACITOR ELECTRODE

(75) Inventors: Masaki Fujii, Kawasaki (JP); Shinya Taguchi, Kawasaki (JP); Keizo Ikai, Kawasaki (JP); Hiroshi Kato, Kawasaki (JP); Kazuhiro Igarashi, Yokohama (JP); Noriyuki Kiuchi, Yokohama (JP); Tsutomu Nakamura, Yokohama (JP); Kiwamu Takeshita, Tokyo (JP)

(73) Assignee: Nippon Oil Corporation, Tokyo (JP)

( * ) Notice: Subject to any disclaimer, the term of this patent is extended or adjusted under 35 U.S.C. 154(b) by 454 days.

(21) Appl. No.: 12/666,324

(22) PCT Filed: Jul. 3, 2008

(86) PCT No.: PCT/JP2008/062433

§ 371 (c)(1),
(2), (4) Date: Jan. 19, 2010

(87) PCT Pub. No.: WO2009/005170

PCT Pub. Date: Jan. 8, 2009

(65) Prior Publication Data

US 2010/0214722 A1 Aug. 26, 2010

(30) Foreign Application Priority Data

Jul. 4, 2007 (JP) ................................ 2007-176468
Mar. 28, 2008 (JP) ................................ 2008-086901

(51) Int. Cl.
*H01G 9/00* (2006.01)
*H01M 4/13* (2010.01)

(52) U.S. Cl. .................................... 361/502; 429/218.1

(58) Field of Classification Search .................. 361/502; 429/218.1
See application file for complete search history.

(56) References Cited

FOREIGN PATENT DOCUMENTS

| | | | |
|---|---|---|---|
| JP | 10-199767 | A | 7/1998 |
| JP | 2000-182904 | A | 6/2000 |
| JP | 2003-077458 | A | 3/2003 |
| JP | 2006-324183 | A | 11/2006 |
| JP | 2007-115749 | A | 5/2007 |

*Primary Examiner* — Eric Thomas
*Assistant Examiner* — Arun Ramaswamy
(74) *Attorney, Agent, or Firm* — Panitch Schwarze Belisario & Nadel LLP

(57) ABSTRACT

The present invention provides a process of producing an activated carbon for an electric double layer capacitor, which can produce easily and inexpensively an activated carbon free from fusing of carbon particles during activation and having a small diameter, a uniform particle diameter, and a relatively large specific surface area on a commercial scale. The process comprises the steps of calcining an easily graphitizable carbon material so that the reduction rates of the hydrogen/carbon atomic ratio (H/C) and the volatile components in the carbon material are 4 percent or more and 5 percent or more, respectively after calcination and activating the carbon material thereby producing an activated carbon for an electric double layer capacitor, having an average particle diameter of 0.5 to 7 μm and a BET specific surface area of 1500 to 3000 $m^2/g$.

9 Claims, 2 Drawing Sheets

● Calculation of Capacitance (Energy Conversion Method)

Capacitance: $C=2U / V_c^2$ $Vc=Vm-\Delta V$

U: Total Discharged Energy (Integral value of discharge curve from full-charge Vm to OV)

Vc: Real voltage obtained by deducting

● Voltage drop by internal resistance from full-charged voltage

PROCESS OF PRODUCING ACTIVATED CARBON FOR ELECTRIC DOUBLE LAYER CAPACITOR ELECTRODE

CROSS-REFERENCE TO RELATED APPLICATION

This application is a section 371 of International Application No. PCT/JP2008/062433, filed Jul. 3, 2008, which was published in the Japanese language on Jan. 8, 2009 under International Publication No. WO 2009/005170 A1 and the disclosure of which is incorporated herein by reference.

FIELD OF THE INVENTION

The present invention relates to a process of producing an activated carbon for an electric double layer capacitor electrode.

BACKGROUND OF THE INVENTION

Activated carbon is made from carbon materials such as carbonized coconut shell, petroleum coke or coal coke that is activated to have a porous structure. The activated carbon that is porous and thus has a large surface area has been widely used as electrode material for double layer capacitors and lithium secondary batteries. In particular, in order to increase the energy density, i.e., capacitance in an electric double layer capacitor used in a hybrid car or the like, an activated carbon with effectively formed fine pores, a high crystallinity and a large surface area has been demanded to be used as an electrode material for the capacitor.

For industrial production of such activated carbon with effectively formed fine pores that can be used as an electrode material of an electric double layer capacitor, an activation method has been generally used, in which a carbon material such as petroleum coke and an alkali metal compound such as potassium hydroxide are heated at a temperature of 600 to 1200° C. in an inert gas atmosphere to allow the alkali metal to ingress between and react with graphite crystal layers. In this activation, the alkali metal enters a layered structure wherein condensated polycyclic hydrocarbons are layered, thereby forming fine pores.

The activated carbon produced by the alkali activation is required to have a relatively large surface area, a small average particle diameter, and a uniform particle size, and contain no bulky particles for the production of an electric double layer capacitor electrode.

In recent years in particular, an electric double layer capacitor used for hybrid cars and electric cars is required to be excellent not only in energy density but also output characteristics.

Conventionally, for the production of an electric double layer capacitor electrode, activated carbon is ground with a ball mill so as to make the particle size uniform thereby producing an activated carbon with a BET specific surface area of 1300 $m^2/g$ or greater and 2200 $m^2/g$ or smaller and an average diameter of 1 μm or greater and 7 μm or smaller (Patent Document 1). In Patent Document 2, an activated carbon with an average diameter of 100 nm to 10 μm is produced by a ball mill grinding method.

Whereas, it is reported in Patent Document 3 that an activated carbon with a small diameter is used to enhance output characteristics. However, this is not sufficient for recent large electric current charge and discharge applications.

(1) Patent Document 1: Japanese Patent Application Laid-Open Publication No. 2000-182904

(2) Patent Document 2: Japanese Patent Application Laid-Open Publication No. 2006-324183

(3) Patent Document 3: Japanese Patent Application Laid-Open Publication No. 2003-077458

DISCLOSURE OF THE INVENTION

There are methods for decreasing the particle diameter of activated carbon, one of which to grind activated carbon to an intended particle size and the other of which to activate fine raw materials to produce activated carbon. The former is not preferable because the fine pores are crushed, resulting in a decrease in specific surface area. The later arises a problem that the resulting activated carbon will have a larger particle diameter than the raw material thereof because particles fused to each other by activation.

As the result of extensive study and research of a process enabling the industrial easy production of activated carbon with a small particle diameter, uniform particle size and relatively large specific surface area and also enabling a grinding step after activation to be eliminated so that the cost can be reduced, the present invention was accomplished on the basis of the finding that fusion of particles during an activation step can be prevented by adjusting the reduction rates of the hydrogen/carbon atomic ratio (H/C) and the volatile component in carbon material after calcination to certain levels or higher.

That is, the present invention relates to a process of producing an activated carbon having an average particle diameter of 0.5 to 7 μm and a BET specific surface area of 1500 to 3000 $m^2/g$, for an electric double layer capacitor electrode, comprising the steps of calcining an easily graphitizable carbon material so that the reduction rates of the hydrogen/carbon atomic ratio (H/C) and the volatile components in the carbon material are 4 percent or more and 5 percent or more, respectively after calcination, and activating the carbon material.

The present invention also relates to the foregoing process wherein the calcination temperature is from 500 to 700° C.

The present invention also relates to the foregoing process wherein the average particle diameter of the easily graphitizable carbon material is 3 μm or smaller.

The present invention also relates to an activated carbon for an electric double layer capacitor produced by any of the foregoing processes.

The present invention also relates to an electric double layer capacitor comprising the foregoing activated carbon.

Effects of the Invention

The present invention can produce easily and inexpensively an activated carbon having a small particle diameter, a uniform particle size and a relatively large specific surface area for an electric double layer capacitor. The use of the activated carbon produced by the present invention provide an activated carbon with a large capacitance per unit volume and excellent output characteristics.

BEST MODE OF CARRYING OUT THE INVENTION

The present invention will be described in more detail below.

In the present invention, it is important that an easily graphitizable carbon material is used as the raw material and calcined so that the reduction rates of the hydrogen/carbon atomic ratio (H/C) and the volatile components in the carbon material are 4 percent or more and 5 percent or more, respectively after calcination.

Examples of the easily graphitizable carbon material used as the starting material in the present invention include carbonized petroleum coke and petroleum pitch coke, and infusibilized and carbonized mesophase pitch and infusibilized and carbonized mesophase carbon fiber produced by spinning mesophase pitch. In the present invention, petroleum coke is preferable, and petroleum green coke is particularly preferable.

The petroleum green coke that is preferably used as the starting material in the present invention is an aggregate where polycyclic aromatic compounds having an alkyl chain are layered and a solid that is not fusible by heat.

The petroleum coke is a product containing mainly solid carbon produced by thermal cracking (coking) a heavy fraction of petroleum at a high temperature on the order of 500° C. and is referred to as petroleum coke against ordinary coal-based coke. There are petroleum coke produced by delayed coking and petroleum coke produced by fluid coking. Currently, the former constitutes the majority. In the present invention, it is preferable to use petroleum green coke (green coke) remaining as it is taken out from a coker. The green coke produced by delayed coking contains 6 to 13 percent by mass of a volatile component while the green coke produced by fluid coking contains 4 to 7 percent by mass of a volatile component. In the present invention, the green coke produced by either of the methods may be used. However, the green coke produced by delayed coking is particularly suitable in view of easy availability and stable quality.

There is no particular restriction on the heavy fraction of petroleum. Examples of the heavy fraction include heavy oil that is a residue produced when petroleums are vacuum-distilled, heavy oil produced by fluid catalytic cracking petroleums, heavy oil produced by hydrodesulfurizing petroleums, and mixtures thereof.

In the present invention, an easily graphitizable carbon material is calcined at a temperature of 500 to 700° C. so that the reduction rates of the hydrogen/carbon atomic ratio (H/C) and the volatile components in the carbon material are adjusted to 4 percent or more and 5 percent or more, respectively after calcination, thereby producing an intended activated carbon having an average particle diameter of 0.5 to 7 μm and a BET specific surface area of 1500 to 3000 $m^2/g$.

The definition "the reduction rate of the hydrogen/carbon atomic ratio (H/C) is 4 percent or more" used herein denotes that the value of (A-B)/A is 4 percent or more, wherein A is the hydrogen/carbon atomic ratio in the carbon material before calcination and B is the hydrogen/carbon atomic ratio in the carbon material after calcination. The definition "the reduction rate of the volatile component is 5 percent or more" used herein denotes that the value of (X-Y)/X is 5 percent or more, wherein X is the content of the volatile component in the carbon material before calcination and Y is the content of the volatile component in the carbon material after calcination.

The reduction rate of the hydrogen/carbon atomic ratio (H/C) of 4 percent or more and the reduction rate of the volatile component of 5 percent or more can be achieved by controlling the calcination temperature and time. Specifically, when the calcination temperature is from 500 to 700° C., the calcination time is usually from 0.01 to 10 hours, preferably from 0.5 to 8 hours. The calcination time is appropriately adjusted depending on conditions such as temperature.

If the reduction rate of the hydrogen/carbon atomic ratio (H/C) is less than 4 percent or if the rate of decrease in the volatile component is less than 5 percent, components produced during the calcination step do not volatilize and thus remain in the particles. As the result, the components act as a binder during activation, causing fusion of particles and thus small particles with the intended average particle diameter can not be produced. A too large reduction rate the hydrogen/carbon atomic ratio (H/C) in the carbon material (hereinafter also referred to as carbide) after calcination is not preferable because carbonization proceeds excessively and thus an activation reaction proceeds insufficiently. As the result, the intended BET specific surface area may not be obtained. Therefore, the upper limit is preferably 30 percent or less, more preferably 20 percent or less. A too large reduction rate of the volatile component after calcination is also not preferable for the same reason as mentioned above. The upper limit is preferably 35 percent or less, more preferably 25 percent or less.

The easily graphitizable carbon material used as the starting material has an average particle diameter of preferably 3 μm or smaller, more preferably from 0.5 to 3 μm, more preferably from 1.0 to 2.8 μm. There is no particular restriction on the method of making the average particle diameter of the easily graphitizable carbon material 3 μm or smaller. Examples of the method include methods wherein an easily graphitizable carbon material is ground by a conventional method such as ball milling, tumbling milling and vibrating milling.

Next, the carbide thus produced by calcination (preheating treatment) is activated by a known method to form activated carbon.

There is no particular restriction on the conditions for activation reaction in the activation step as long as the reaction can proceeds sufficiently. Therefore, the activation reaction may be carried out under conditions that are the same as those for known activation reactions carried out for the production of usual activated carbon. For example, the activation reaction in the activation step may be carried out by mixing an alkali metal hydroxide with carbide having been calcined as done in the production of normal activated carbon and heating the mixture under high temperature conditions where the temperature is preferably 400° C. or higher, more preferably 600° C. or higher, more preferably 700° C. or higher. There is no particular restriction on the upper limit of this heating temperature if the activation reaction proceeds without any trouble. However, the upper limit is preferably 900° C. or lower.

Examples of the alkali metal hydroxide used in the activation step include KOH, NaOH, RbOH, and CsOH. Particularly preferred is KOH in view of activation efficiency.

The alkali activation method is usually carried out by mixing an activation agent such as an alkali metal compound with carbide and heating the mixture. There is no particular restriction on the mix ratio of the carbide and the activation agent. However, the mass ratio of the both (carbide:activation agent) is within the range of preferably 1:0.5 to 1:5, more preferably 1:1 to 1:3.

After the carbide is activated, it is then subjected to alkali washing, acid washing, water washing, drying and grinding thereby producing activated carbon. When an alkali metal compound is used as the activation agent, there is no particular restriction on the amount of the alkali metal remaining the carbide if the amount is lower than the level (preferably 1000 ppm by mass or less) that possibly adversely affects the resulting electric double layer capacitor. However, for example, the carbide is preferably washed so that the pH of the detergent drain is from 7 to 8 and washed so that the alkali metal is removed as much as possible. After washing, the carbide undergoes a drying step that is conventionally carried out, thereby producing the intended activated carbon.

The activated carbon particles produced by the present invention are characterized in that they have a uniform particle size even if a grinding step for further grinding using a ball mill is omitted.

That is, the present invention enables the production of an activated carbon with an average particle diameter of 7 μm or smaller. The average particle diameter of the activated carbon produced by the present invention is usually from 0.5 to 7 μm, preferably from 0.5 to 5 μm, more preferably from 1 to 5 μm. The specific surface area of the activated carbon produced by the present invention is 1500 $m^2/g$ or greater, usually from 1500 to 3000 $m^2/g$. The pore volume of the diameter of 0.1 to 50 nm of the activated carbon produced by the present invention, determined by a nitrogen gas absorption method is from 0.1 to 3 ml/g while the alkali metal content is 200 ppm by mass or less.

Next, description will be given of the electric double layer capacitor of the present invention.

The electric double layer capacitor of the present invention is characterized in that it is provided with electrodes containing an activated carbon prepared as described above.

The electrodes is configured with the activated carbon and a binder and preferably in addition an electric conductive agent and may be electrodes that are integrated with a collector.

The binder used herein may be any conventional one. Examples of the binder include polyolefins such as polyethylene and polypropylene, fluorinated polymers such as polytetrafluoroethylene, polyvinylidene fluoride and fluoroolefin/vinylether cross-linked copolymers, celluloses such as carboxylmethyl cellulose, vinyl polymers such as polyvinylpyrrolidone and polyvinyl alcohol, and polyacrylic acids. There is no particular restriction on the content of the binder in the electrode. The content is usually selected within the range of 0.1 to 30 percent by mass on the basis of the total amount of the activated carbon and the binder.

The electric conductive agent may be a powdery material such as carbon black, powder graphite, titanium oxide and ruthenium oxide. The blend amount of the electric conductive material in the electrode is suitably selected depending on the purposes of blending. The blend amount is usually selected within the range of usually 1 to 50 percent by mass, preferably from 2 to 30 percent by mass on the basis of the total amount of the activated carbon, binder and electric conductive agent.

The activated carbon, binder and electric conductive agent may be mixed by a conventional method. For example, there may be employed a method wherein a solvent that dissolves the binder is added to these components to prepare slurry, which is then applied evenly on a collector and a method wherein these components are kneaded without adding such a solvent and pressed at ordinary temperature or under heating.

The collector may be any of those of conventional materials with conventional shapes. Examples of the material include metals such as aluminum, titanium, tantalum, and nickel and alloys such as stainless.

The unit cell of the electric double layer capacitor of the present invention is formed by placing a pair of the above-described electrodes used as an anode and a cathode to face each other via a separator (polypropylene fiber nonwoven fabric, glass fiber fabric or synthetic cellulose paper) and then immersing the electrodes into an electrolytic solution.

The electrolytic solution may be any of aqueous or organic electrolytic solutions known in the art. However, organic electrolytic solutions are preferably used. Examples of such organic electrolytic solutions include those used for electrochemical electrolytic solutions such as propylene carbonate, ethylene carbonate, butylene carbonate, γ-butyrolactone, sulfolane, sulfolane derivatives, 3-methylsulfolane, 1,2-dimethoxyethane, acetonitrile, glutaronitrile, valeronitrile, dimethylformamide, dimethylsulfoxide, tetrahydrofuran, dimethoxyethane, methyl formate, dimethyl carbonate, diethyl carbonate, and ethyl methyl carbonate. Note that these electrolytic solutions may be used in combination.

There is no particular restriction on a supporting electrolyte in the organic electrolytic solution. Therefore, the supporting electrolyte may be any of various salts, acids, and alkalis that are generally used in the electrochemical field or the battery field. Examples of such a supporting electrolyte include inorganic ionic salts such as alkali metal salts and alkaline earth metal salts, quaternary ammonium salts, cyclic quaternary ammonium salts, and quaternary phosphonium salts. Preferable examples include $(C_2H_5)_4NBF_4$, $(C_2H_5)_3(CH_3)NBF_4$, $(C_2H_5)_4PBF_4$, $(C_2H_5)_3(CH_3)PBF_4$. The concentrations of such salts in electrolytic solutions are properly selected from the range of usually 0.1 to 5 mol/l, preferably 0.5 to 3 mol/l.

There is no particular restriction on the more specific configuration of the electric double layer capacitor. However, example of the configuration include a coin type accommodating a pair of electrodes (positive and negative electrodes) in the form of sheet or disc with a thickness of 10 to 500 μm and a separator sandwiched between the electrodes, in a metal case, a wound type comprising a pair or electrodes and a separator disposed therebetween, all of which are wound, and a layered type comprising electrodes stacked via separators.

EXAMPLES

The present invention will be described in more details with reference to the following examples but is not limited thereto.

Example 1

The petroleum green coke used as the raw material in this example was produced by thermal-cracking a mixture of 30 percent by volume of a vacuum residue from Minas crude oil and 70 percent by volume of a heavy oil produced upon fluid catalytic cracking of a vacuum gas oil from a middle east crude oil, at a temperature of 500 to 600° C. using a delayed coker. The physical properties of the petroleum green coke are set forth in Table 1.

The petroleum green coke was calcined under the conditions set forth in Table 1, i.e., at a temperature of 550° C. for 3 hours. Thereupon, the temperature rise rate was 200° C./hour. The physical properties of the resulting carbide after calcination are set forth in Table 1. The carbide was ground with a ball-mill, and the resulting particle size distribution is set forth in Table 2. The average particle diameter (D50) was 1.7 μm. Potassium hydroxide was blended in an amount of 220 parts by mass with 100 parts by mass of the ground product thus produced. An activation reaction is allowed to proceed at a temperature of 700° C. for one hours in a nitrogen gas atmosphere. After the reaction, the reaction mixture was repeatedly washed with water and then with an acid (using hydrochloric acid) to remove metallic potassium remaining in the carbon material, and dried to produce an activated product (carbon material for an EDLC electrode). The specific surface area of the resulting activated product was determined in the following manner, and also the particle size distribution was measured (FIG. 1). The average particle diameter was 1.8 μm.

Hydrogen/carbon atomic ratio: calculated by determining the carbon weight percent and hydrogen weight percent in a sample using an organic element analyzer (SUMIGRAPH, NCH-22F manufactured by Sumika Chemical Analysis Service, Ltd)

Volatile component: measured in accordance with the method of JIS M8812 "Coal and coke-Methods for proximate analysis"

True density: measured in accordance with JIS K2151

Specific surface area: measured by the nitrogen gas adsorption method (BET method)

Particle size distribution: measured using a laser diffraction particle size analyzer (LA-950 manufactured by HORIBA, Ltd.) after adding a small amount of surfactant containing water as dispersant and irradiating ultrasonic wave to a sample. From the resulting particle size integral curve on the basis of the volume, 10% particle size, 50% particle size (average particle size) and 90% particle size were determined.

To 80 parts by mass of the activated product produced above were added 10 parts by mass of carbon black and 10 parts by mass of polytetrafluoroethylene powder. The mixture was kneaded in a mortar until it turned into paste. Then, the resulting paste was rolled using a roller press at 180 kPa to prepare an electrode sheet having a thickness of 200 μm.

Two discs each having a diameter of 16 mm were punched out from the electrode sheet, and then vacuum dried at a temperature of 120° C. at 13.3 Pa (0.1 Torr) for two hours. Thereafter, the disc-like electrodes were vacuum impregnated with an organic electrolytic solution (a propylene carbonate solution of tirethylmethylammonium tetrafluoro borate, concentration: 1 mol/l) in a glove box under a nitrogen atmosphere with a dew point of −85° C. Then, the two sheets of electrodes were used as positive and negative electrodes, respectively, and a cellulose separator (manufactured by NIPPON KODOSHI CORPORATION, trade name: TF40-50, thickness: 50 μm) was interposed between the electrodes. Collectors of aluminum foils were attached to the both ends of the electrodes, and then electrodes were incorporated into a bipolar cell manufactured by Hosen Corporation to prepare an electric double layer capacitor (coin type cell). The capacitance of the resulting capacitor was measured by the following method. The results are set forth in Table 3.

Capacitance: The coin type cell was charged up to 2.7 V with a constant current of 2 mA per 1F. After the charging was completed, the cell was maintained at 2.7 V for 30 minutes and then discharged at a constant current of 1 mA at a temperature of 20° C. In a discharging curve where 80% of the charged voltage is defined as V1, 40% of the charged voltage is defined as V2, the time that the voltage takes for decreasing from 80% to 40% is defined as ΔT, and a discharging current value is defined as I, capacitance C[F] is calculated by the following formula:

$$\text{Capacitance } C[F]=I\Delta T/(V1-V2).$$

The capacitance is divided by the weight of activated carbon contained in the electrodes (the total weight of positive and negative electrodes), from which the capacitance [F/g] per weight is derived. This F/g was multiplied by electrode density [g/cc] to calculate F/cc.

Example 2

The raw material used in this examples was produced by coking a mixture of 90 percent by volume of a bottom oil of a petroleum heavy oil obtained from a fluid catalytic cracker and 10 percent by volume of a vacuum distillation residue at a temperature of 500° C. for one hour. The raw material was calcined at a temperature of 600° C. for one hour thereby producing a carbide. The rest of the procedures was carried out in the same manner as that in Example 1.

TABLE 1

| | Calcination | Calcination | H/C Atomic Ratio | | Volatile Component | | True |
|---|---|---|---|---|---|---|---|
| | Temperature ° C. | Time hr | — | Reduction Rate % | mass % | Reduction Rate % | Density g/cm$^3$ |
| Example 1 | Raw Material | | 0.418 | — | 4.8 | — | 1.36 |
| | 550 | 3 | 0.398 | 4.7 | 4.2 | 12.5 | 1.37 |
| Example 2 | Raw Material | | 0.422 | — | 5.8 | — | 1.38 |
| | 600 | 1 | 0.367 | 13 | 4.9 | 15.5 | 1.42 |

TABLE 2

| | Before Activation (Carbide) | | | After Activation (Activated Carbon) | | | |
|---|---|---|---|---|---|---|---|
| | Particle Size Distribution (μm) | | | Particle Size Distribution (μm) | | | Specific Surface Area |
| | D10 | D50 | D90 | D10 | D50 | D90 | m$^2$/g |
| Example 1 | 0.9 | 1.7 | 2.6 | 1 | 1.8 | 3 | 2350 |
| Example 2 | 1.4 | 2.8 | 5 | 1.4 | 3.2 | 6 | 2240 |

TABLE 3

| | Electrode Density g/cc | Capacitance F/g | Capacitance F/cc |
|---|---|---|---|
| Example 1 | 0.507 | 48.2 | 24.5 |
| Example 2 | 0.518 | 47.8 | 24.8 |

As shown in the above, when a carbide has a reduction rate of the H/C atomic ratio of 4 percent or more or a reduction rate of the volatile component of 5 percent or more after calcination, the electric double layer capacitor using such activated carbon produced by activating the carbide had a relative large capacitance per unit volume.

Example 3

As the starting material was used petroleum green coke (carbon material) having an average diameter of 2.2 μm, which was calcined (preheating treatment) at a temperature of 550° C. for one hour before activation. The physical properties of the carbide after the preheating treatment are set forth in Table 4.

Thereafter, the heat-treated product of the carbon material was mixed with KOH so that the mix weight ratio (KOH/Coke ratio) was 2.0. An activation reaction is allowed to proceed at a temperature of 750° C. for one hour in a nitrogen gas atmosphere. After the reaction, the reaction mixture was repeatedly washed with water and then with hydrochloric acid to remove metallic potassium remaining in the carbon material, and dried to produce an activated product (carbon material for an electrode). As the powder characteristics of the resulting carbon material for an electrode, the particle size distribution (laser diffraction particle size analyzer) and specific surface area (nitrogen gas adsorption method: BET method) were measured.

The carbon material for an electrode was mixed with carbon black and polytetrafluoroethylene powder and then pressed to prepare a carbon electrode sheet with a thickness of 150 to 300 μm. Electrodes with a predetermined size were punched out from the electrode sheet to prepare a laminated cell shown in FIG. 3 in order to evaluate the carbon electrodes for a capacitor. The electrolytic solution used in this examples was a standard propylene carbonate (PC) solution of 1.5 M of triethylmethylammonium tetrafluoroborate ($TEMA.BF_4$).

Then, the initial characteristics (capacitance, internal resistance) of a capacitor were measured using the laminated cell. FIG. 4 shows how the measurement was carried out. The capacitance was determined by measuring the total amount of energy stored in the capacitor (energy conversion method) and calculated therefrom. The internal resistance was calculated from the IR drop immediately after the initiation of discharge. Further, the rate characteristics of the capacitor was also evaluated by measuring the capacitance when the constant current discharged value was changed from 0.36 $mA/cm^2$ to 72 $mA/cm^2$. The results of the rate characteristics were summarized as capacitance retaining rates on the basis of the capacitance when discharged at a constant current of 0.36 $mA/cm^2$.

The results are set forth in Table 4.

Example 4

The procedures of Example 3 were repeated except that the preheating treatment before activation was carried out at a temperature of 550° C. for 2 hours. The results are set forth in Table 4.

Example 5

The procedures of Example 4 were repeated except that KOH and the preheated product of the carbon raw material were mixed so that the mix ratio (KOH/Coke ratio) was 2.6 so as to make the specific surface area of the carbon material for an electrode after activation larger. The results are set forth in Table 4.

Comparative Example 1

The procedures of Example 3 were repeated except that activation was carried out without the preheating treatment. As the result, the activated carbon thus produced coagulated and thus has a particle diameter of 9.0 μm. The results are set forth in Table 5.

Comparative Example 2

The procedures of Example 3 were repeated except that a carbon material with a particle diameter of 4.0 μm was used as the starting material and the preheating treatment before activation was not carried out. The activated carbon thus produced had a particle diameter of 9.8 μm. The results are set forth in Table 5.

Comparative Example 3

The procedures of Example 3 were repeated except that a carbon material with a particle diameter of 4.0 μm was used as the starting material. The activated carbon thus produced had a particle diameter of 8.4 μm. The results are set forth in Table 5.

Comparative Example 4

The procedures of Example 3 were repeated except that a carbon material with a particle diameter of 7.0 μm was used as the starting material and the preheating treatment before activation was not carried out. The activated carbon thus produced had a particle diameter of 9.9 μm. The results are set forth in Table 5.

Comparative Example 5

The procedures of Example 3 were repeated except that activation was carried out using a carbon material with a particle diameter of 7.0 μm as the starting material. The activated carbon thus produced had a particle diameter of 9.0 μm. The results are set forth in Table 5.

As set forth in Tables 4 and 5, Examples 3 to 5 had a smaller diameter and excellent internal resistance and rate characteristics, comparing with Comparative Examples 1 to 5. In particular, Examples 4 and 5 wherein the time of the preheating treatment at temperature of 550° C. before activation was prolonged exhibited excellent internal resistance and rate characteristics.

TABLE 4

| | | Example 3 | Example 4 | Example 5 |
|---|---|---|---|---|
| Starting Carbon Material Particle Diameter (D50) μm | | 2.2 | | |
| Preheating Treatment | | 550° C. for 1 hour | 550° C. for 2 hours | |
| Reduction Rate of H/C Atomic Ratio % | | 4.1 | 4.5 | |
| Reduction Rate of Volatile Component % | | 5.9 | 8.2 | |
| Activation Conditions | | KOH Activation, 750° C. for 1 hour | | |
| Carbon Material for Electrode | Particle Diameter (D50) μm | 6.6 | 6.2 | 6.7 |
| | Specific Surface Area $m^2/g$ | 1778 | 1782 | 2030 |

TABLE 4-continued

| | | Example 3 | Example 4 | Example 5 |
|---|---|---|---|---|
| Capacitor Characteristics | Capacitance F/cc | 23.9 | 23.3 | 23.4 |
| | Internal Resistance Ω | 3.5 | 3 | 3.1 |
| | Rate Characteristics [1)] | 55.8 | 59.2 | 58.5 |

[1)] Retaining rate of capacitance at a constant current discharge (72 mA/$cm^2$) on the basis of capacitance per volume at a constant current discharge (0.36 mA/$cm^2$)

TABLE 5

| | | Comparative Example 1 | Comparative Example 2 | Comparative Example 3 | Comparative Example 4 | Comparative Example 5 |
|---|---|---|---|---|---|---|
| Starting Carbon Material Particle Diameter (D50) μm | | 2.2 | 4.0 | | 7.0 | |
| Preheating Treatment | | — | — | 550° C. for 1 hour | — | 550° C. for 1 hour |
| Reduction Rate of H/C Atomic Ratio % | | — | — | 4.3 | — | 3.7 |
| Reduction Rate of Volatile Component % | | — | — | 6.1 | — | 6.5 |
| Activation Conditions | | KOH Activation, 750° C. for 1 hour | | | | |
| Carbon Material for Electrode | Particle Diameter (D50) μm | 9.0 | 9.8 | 8.4 | 9.9 | 9.0 |
| | Specific Surface Area $m^2/g$ | 1773 | 2080 | 2050 | 2299 | 2250 |
| Capacitor Characteristics | Capacitance F/cc | 24.3 | 24.3 | 24.1 | 24.5 | 24.3 |
| | Internal Resistance Ω | 3.6 | 3.5 | 3.3 | 3.6 | 3.6 |
| | Rate Characteristics [1)] | 52.6 | 52.5 | 53.5 | 51.7 | 52.0 |

[1)] Retaining rate of capacitance at a constant current discharge (72 mA/$cm^2$) on the basis of capacitance per volume at a constant current discharge (0.36 mA/$cm^2$)

INDUSTRIAL APPLICABILITY

Figure 1:
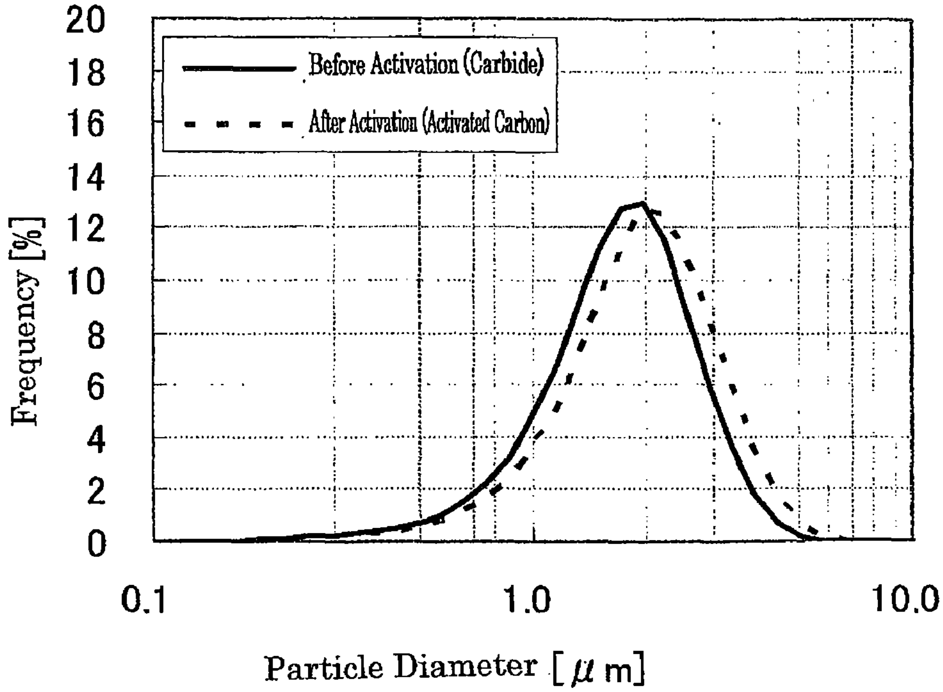
FIG. 1 shows the particle size distribution curves of the activated carbon and carbide before activation in Example 1.
Figure 2:
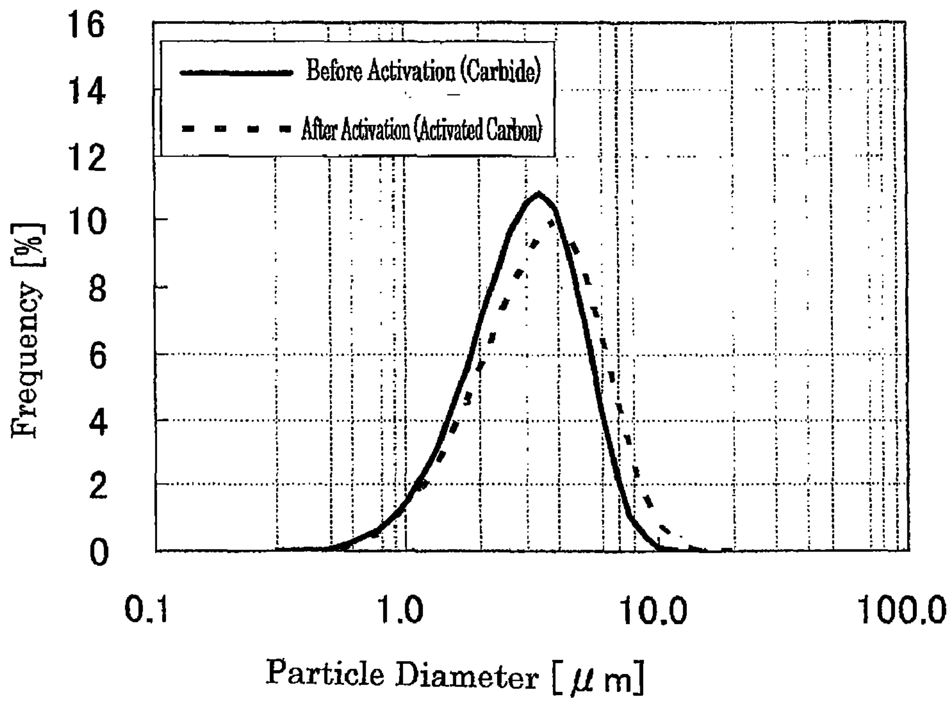
FIG. 2 shows the particle size distribution curves of the activated carbon and carbide before activation in Example 2.
Figure 3:
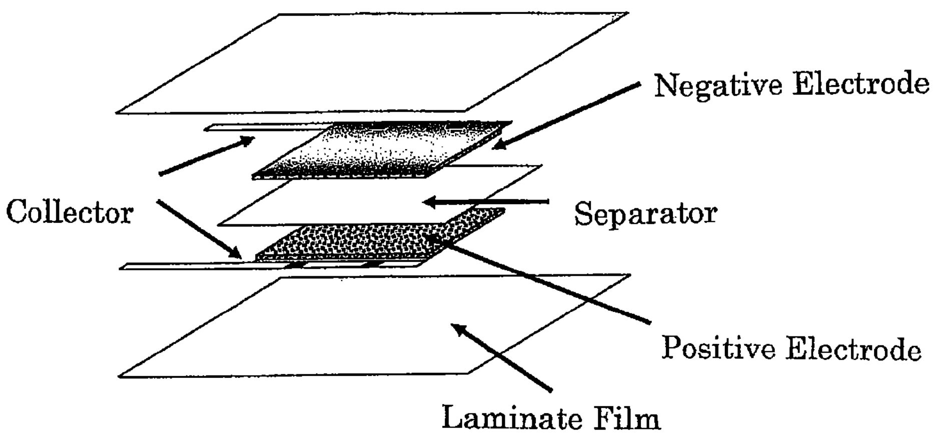
FIG. 3 shows the configuration of a laminated cell used for evaluating a capacitor.
Figure 4:
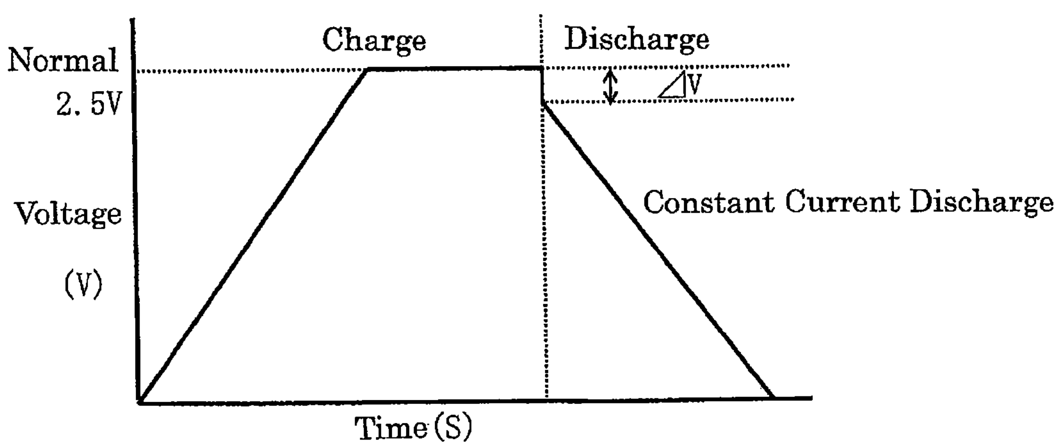
FIG. 4 shows a method for measuring the initial characteristics of a capacitor.

The present invention provides enables the easy and cost effective production of an activated carbon with a small particle diameter, a uniform particle size and a relatively large specific surface area, for an electric double layer capacitor. The use of the activated carbon of the present invention in an electrode can provide a large capacitance per unit volume and excellent output characteristics. Therefore, the present invention has a significant industrial value.

The invention claimed is:

1. A process of producing an activated carbon having an average particle diameter of 0.5 to 7 μm and a BET specific surface area of 1500 to 3000 $m^2$/g, for an electric double layer capacitor electrode, comprising the steps of:

calcining an easily graphitizable carbon material so that the reduction rates of the hydrogen/carbon atomic ratio (H/C) and the volatile components in the carbon material are 4 percent or more and 5 percent or more, respectively after calcination; and activating the carbon material.

2. The process according to claim 1, wherein the calcination temperature is from 500 to 700° C.

3. The process according to claim 1 wherein the average particle diameter of the easily graphitizable carbon material is 3 μm or smaller.

4. An activated carbon for an electric double layer capacitor produced by the process according to claim 1.

5. An electric double layer capacitor comprising the activated carbon according to claim 4.

6. An activated carbon for an electric double layer capacitor produced by the process according to claim 2.

7. An electric double layer capacitor comprising the activated carbon according to claim 6.

8. An activated carbon for an electric double layer capacitor produced by the process according to claim 3.

9. An electric double layer capacitor comprising the activated carbon according to claim 8.

* * * * *